(12) United States Patent
Malone et al.

(10) Patent No.: US 6,663,155 B1
(45) Date of Patent: Dec. 16, 2003

(54) VEHICULAR CONSOLE WITH ADJUSTABLY-MOUNTED VIDEO DISPLAY UNIT

(75) Inventors: Brian J. Malone, Hudsonville, MI (US); Timothy J. Kelly, Grand Rapids, MI (US)

(73) Assignee: Meridian Automotive Sytems, Inc., Dearborn, MI (US)

( * ) Notice: Subject to any disclaimer, the term of this patent is extended or adjusted under 35 U.S.C. 154(b) by 0 days.

(21) Appl. No.: 09/699,017

(22) Filed: Oct. 27, 2000

Related U.S. Application Data

(60) Provisional application No. 60/161,866, filed on Oct. 27, 1999.

(51) Int. Cl.⁷ .............................................. B60R 11/02
(52) U.S. Cl. ...................................... 296/37.8; 224/539
(58) Field of Search ............................ 396/37.8, 37.14, 396/37.16; 224/539

(56) References Cited

U.S. PATENT DOCUMENTS

| | | | |
|---|---|---|---|
| 4,982,996 A | | 1/1991 | Vottero-Fin et al. |
| 5,076,524 A | | 12/1991 | Reh et al. |
| 5,161,028 A | | 11/1992 | Kawata et al. |
| 5,177,616 A | * | 1/1993 | Riday |
| 5,179,447 A | | 1/1993 | Lain |
| 5,195,709 A | | 3/1993 | Yasushi |
| 5,311,302 A | | 5/1994 | Berry et al. |
| 5,316,369 A | | 5/1994 | Kanda |
| 5,338,081 A | | 8/1994 | Young et al. |
| 5,362,144 A | | 11/1994 | Shioya et al. |
| 5,397,160 A | * | 3/1995 | Landry |
| 5,667,179 A | * | 9/1997 | Rosen |
| 5,775,762 A | | 7/1998 | Vitito |
| 5,822,023 A | | 10/1998 | Suman et al. |
| 5,823,599 A | | 10/1998 | Gray |
| 5,836,496 A | | 11/1998 | Levin et al. |
| 5,842,715 A | | 12/1998 | Jones |
| 5,850,997 A | | 12/1998 | Rosen |
| 5,927,784 A | | 7/1999 | Vitito |
| 5,940,120 A | | 8/1999 | Frankhouse et al. |
| 5,941,488 A | | 8/1999 | Rosen |
| 5,946,055 A | | 8/1999 | Rosen |
| 5,949,345 A | | 9/1999 | Beckert et al. |
| 6,152,514 A | * | 11/2000 | McLellen ................ 296/37.8 |
| 6,186,459 B1 | * | 2/2001 | Ma ...................... 296/37.8 X |
| 6,361,012 B1 | * | 3/2002 | Chang ................. 296/37.8 X |
| 6,364,390 B1 | * | 4/2002 | Finneman ............... 296/37.7 |

OTHER PUBLICATIONS

"Luxury for Less," Consumer Reports, Oct. 1999, pp. 12–15.

* cited by examiner

Primary Examiner—Joseph D. Pape
(74) Attorney, Agent, or Firm—McDonnell Boehnen Hulbert & Berghoff

(57) ABSTRACT

A console-stored video display unit is provided that can be extended to a viewing position wherein the video display unit is adjustable both about a vertical pivot axis as well as a horizontal pivot axis to allow tilting and other reorientation of the video display unit to provide for optimal viewing results by occupants of the passenger compartment of a vehicle. In addition, the video display unit, when extended to the viewing position, can be vertically adjusted to place the video display unit in an optimal viewing height for whatever the ergonomic considerations happen to be for occupants of the vehicle interior. The display unit also includes a console interface portion forming a smooth, aesthetically-pleasing surface for the console when the display unit is positioned in a retracted position within the console.

5 Claims, 16 Drawing Sheets

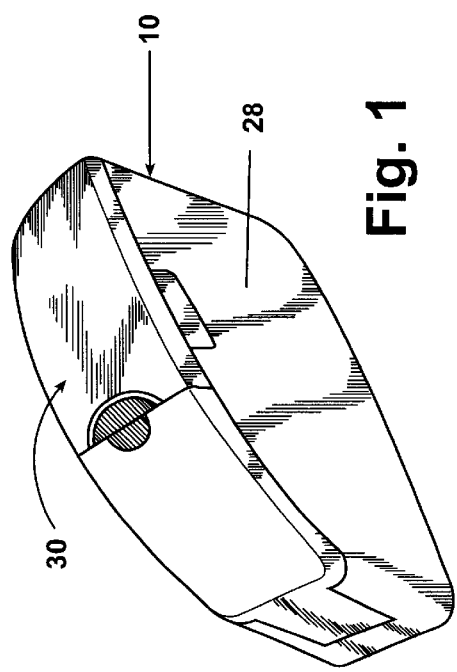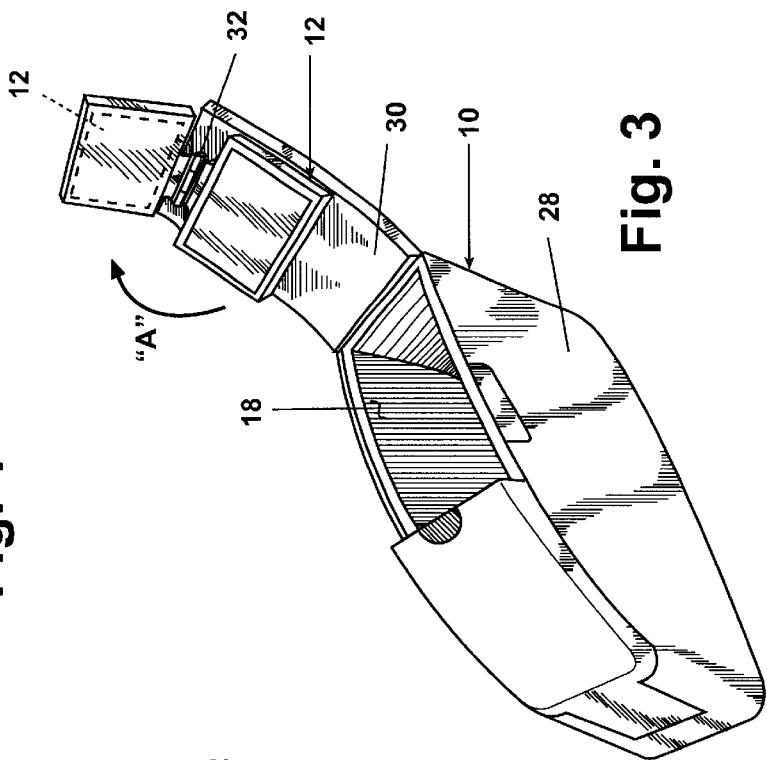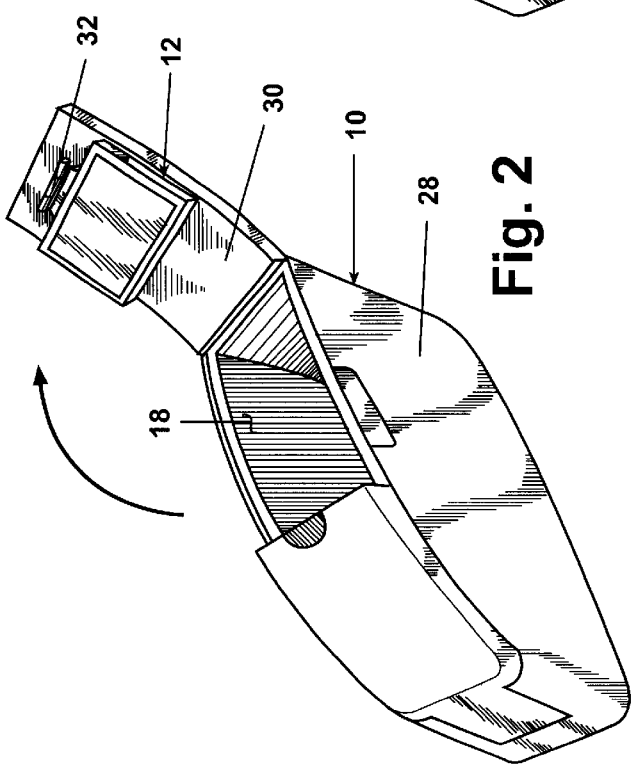

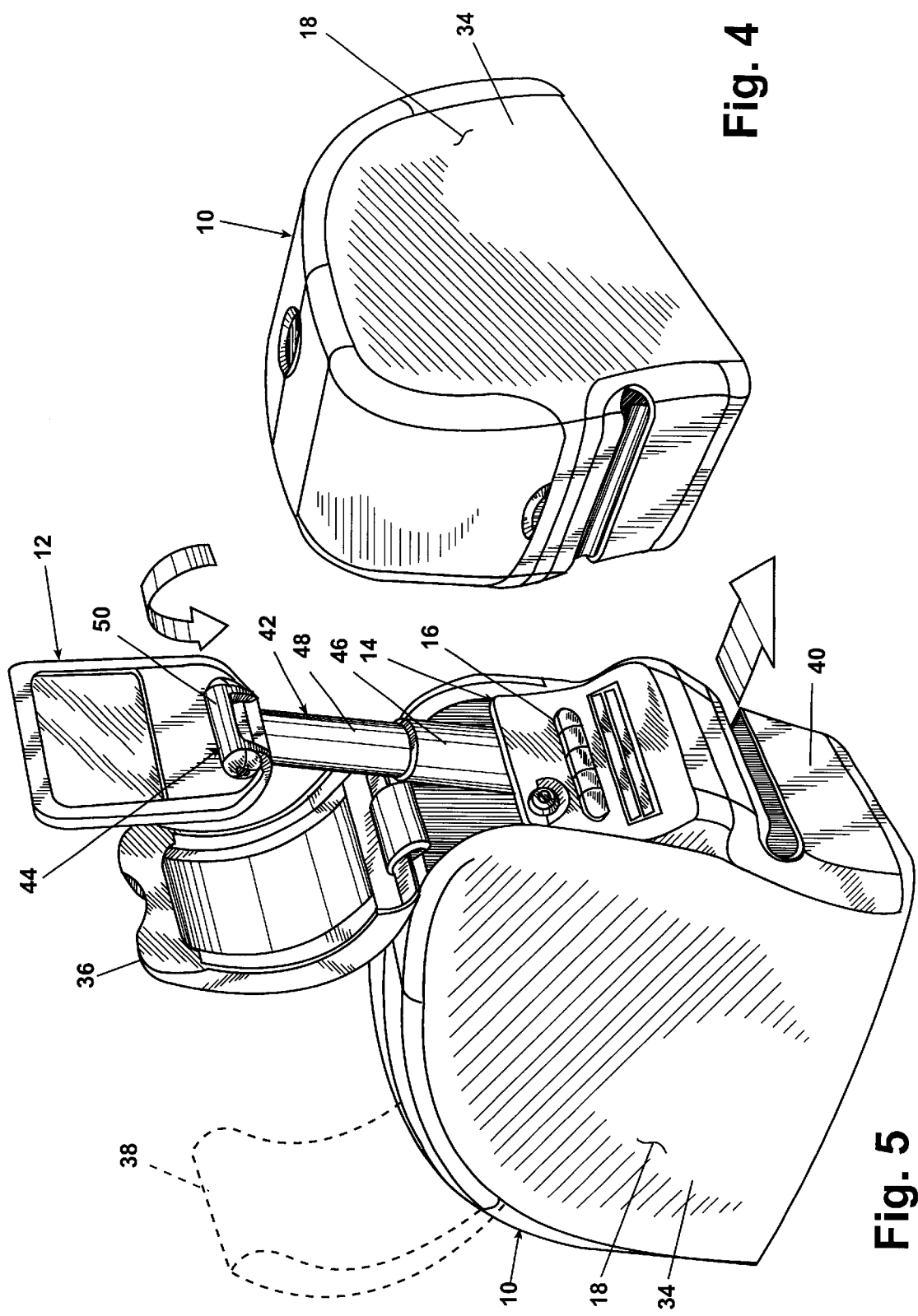

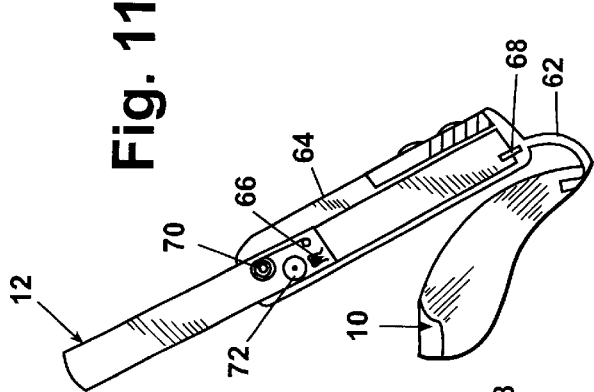
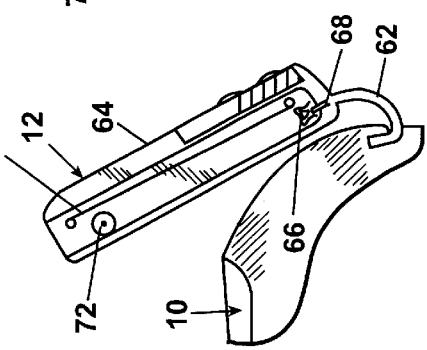
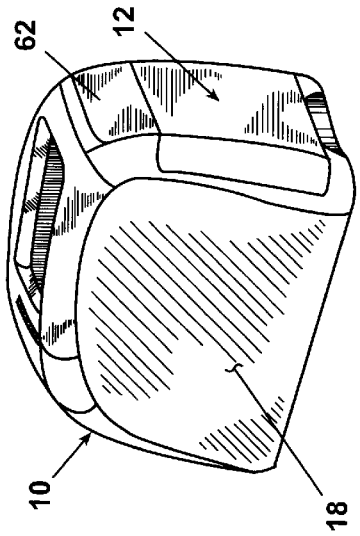
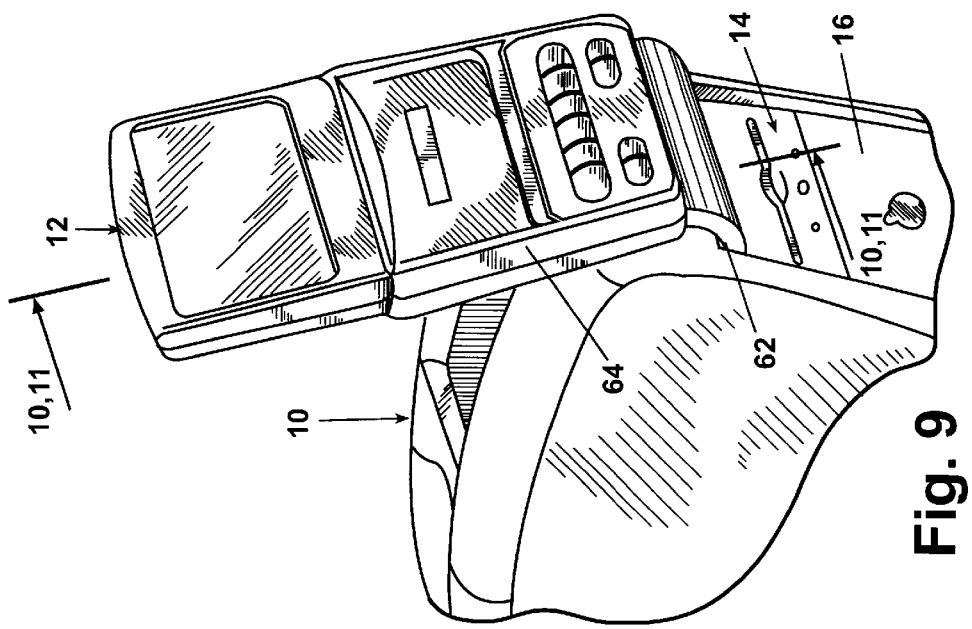

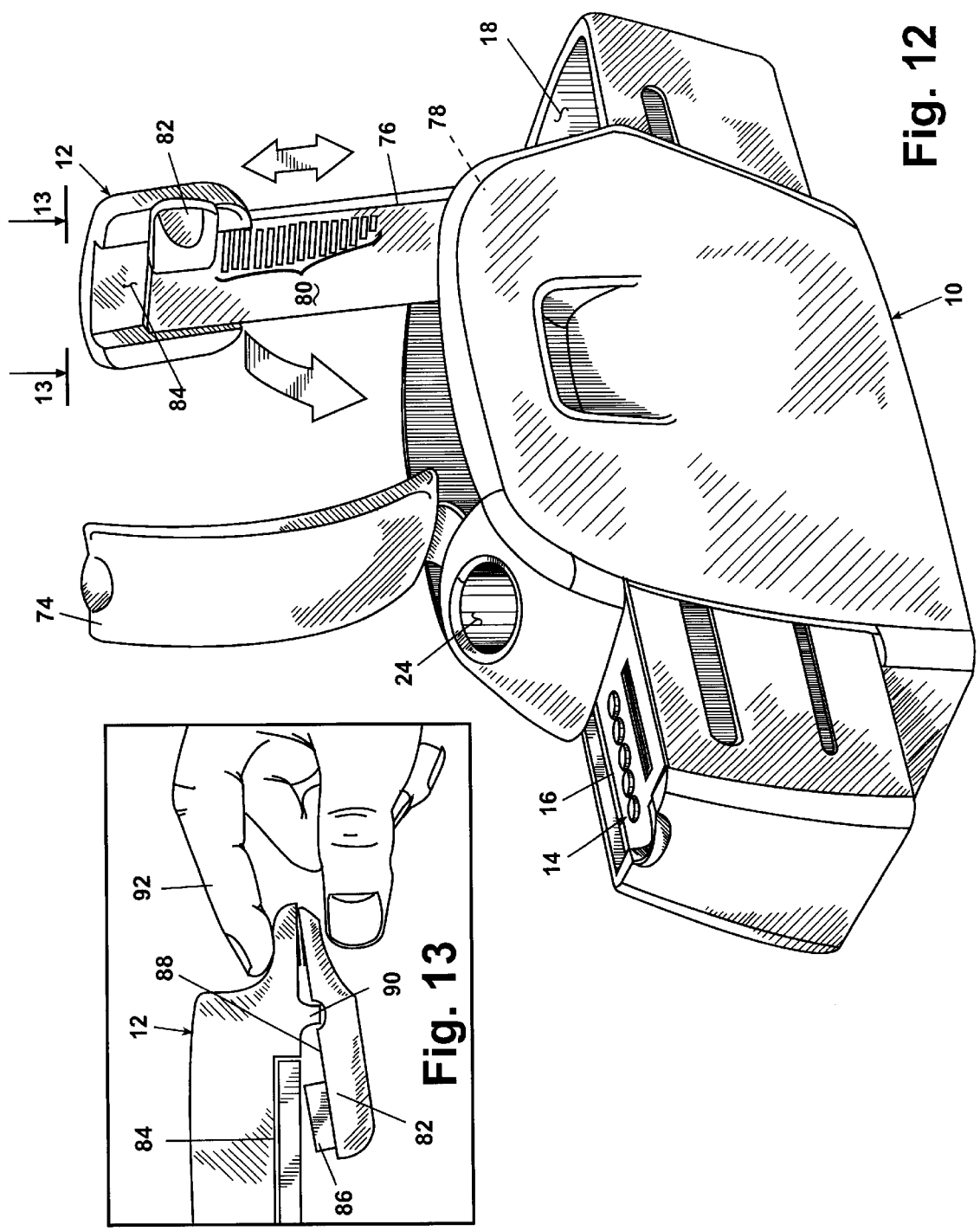

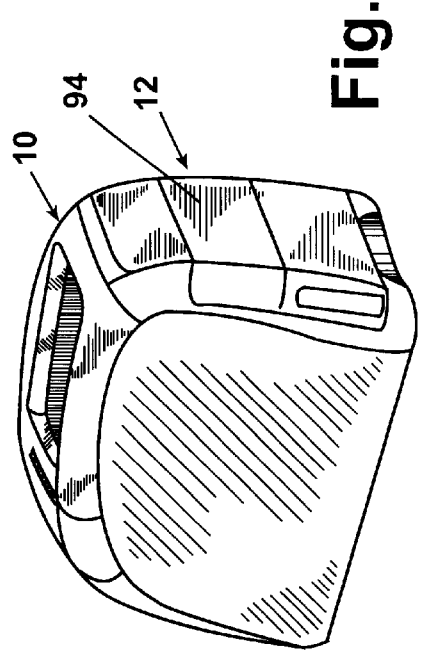
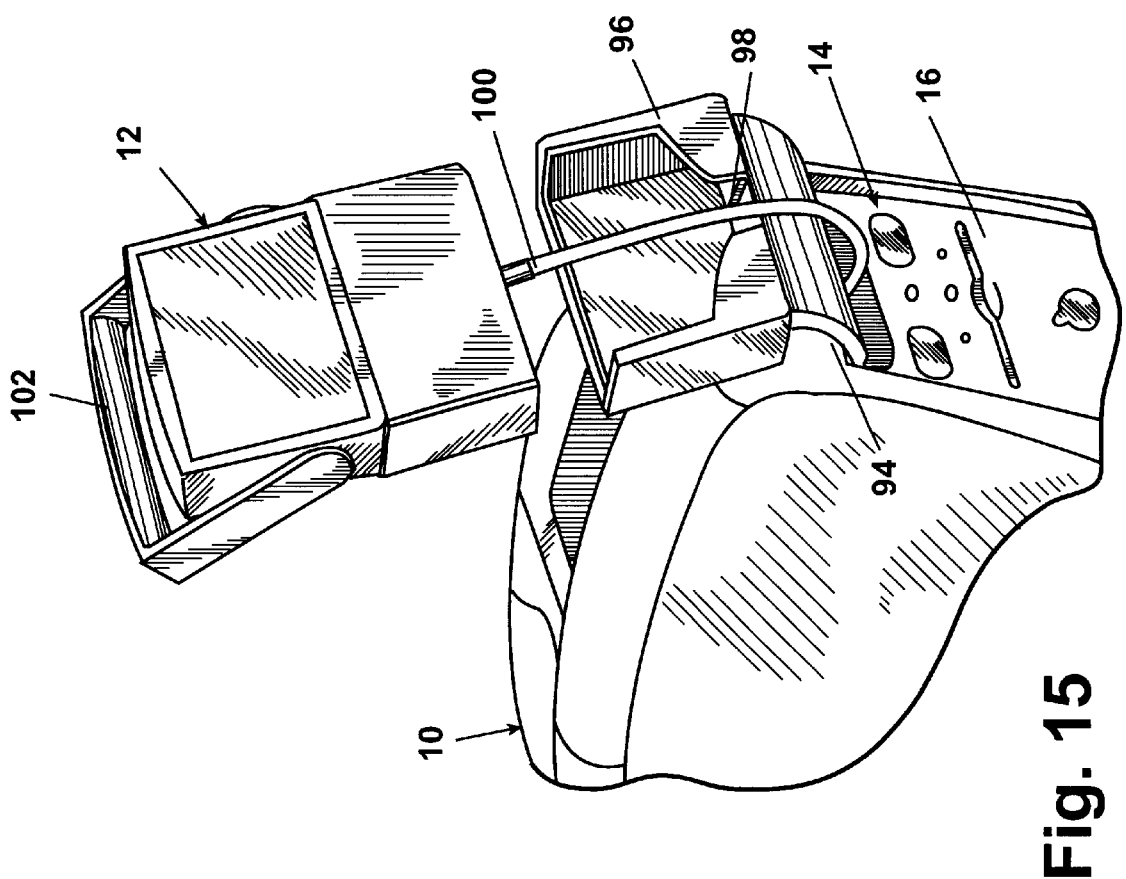

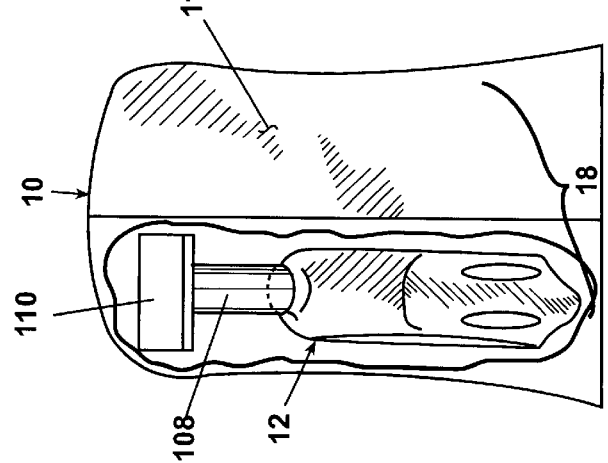
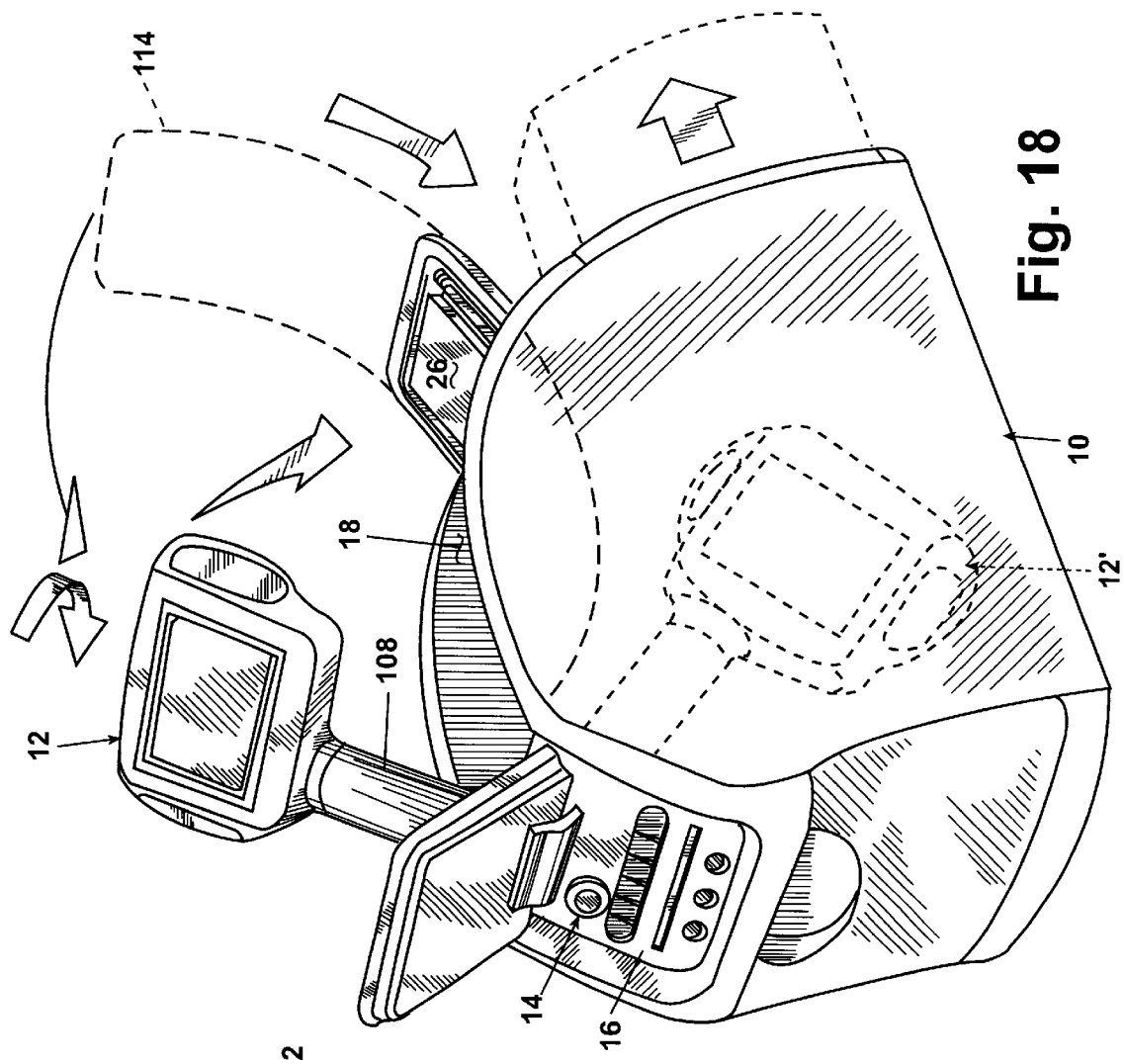
Fig. 17
Fig. 18

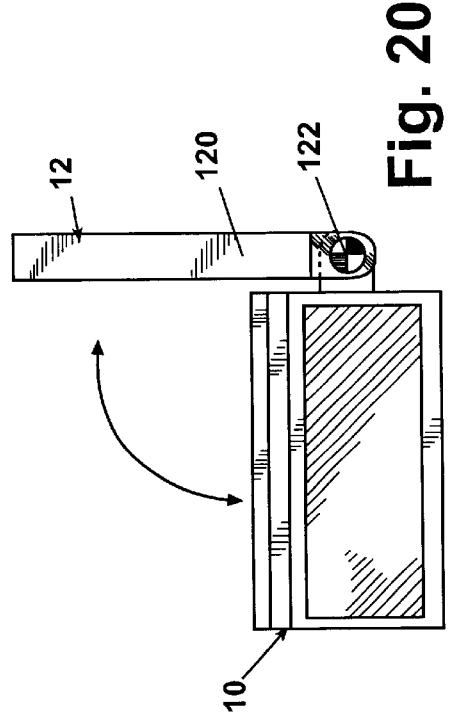
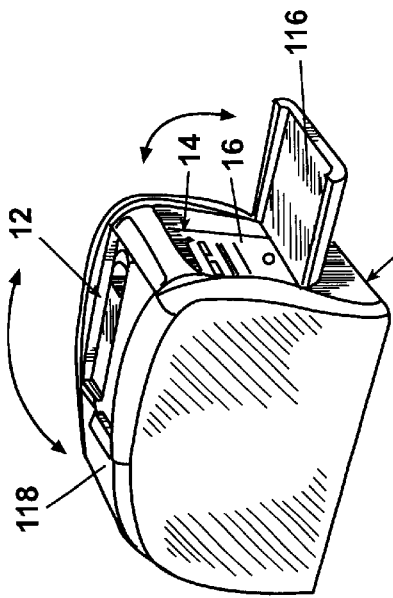
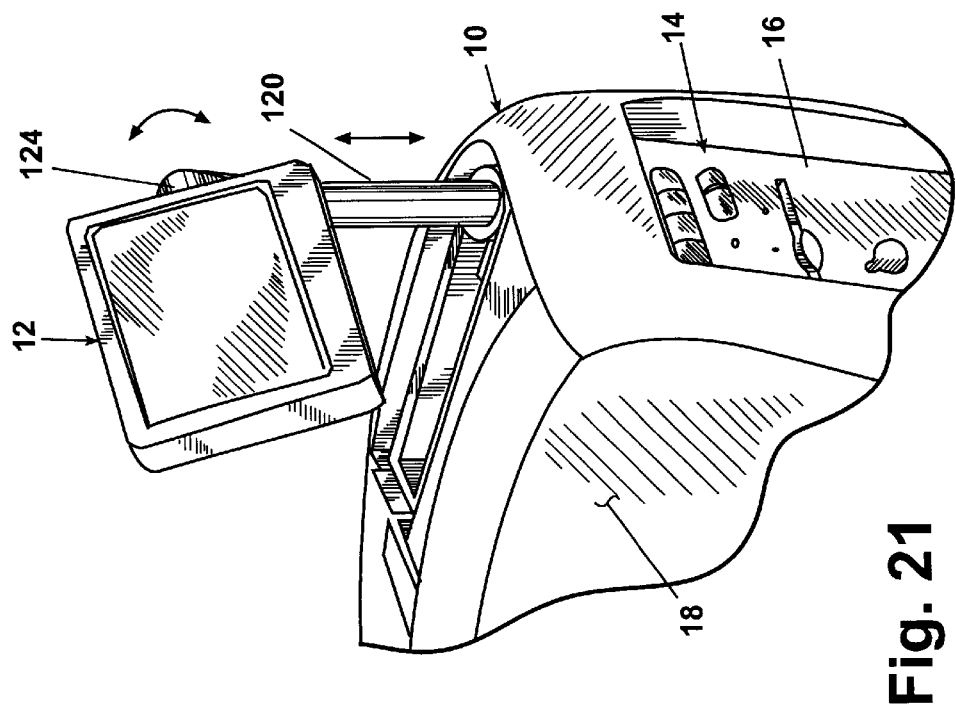

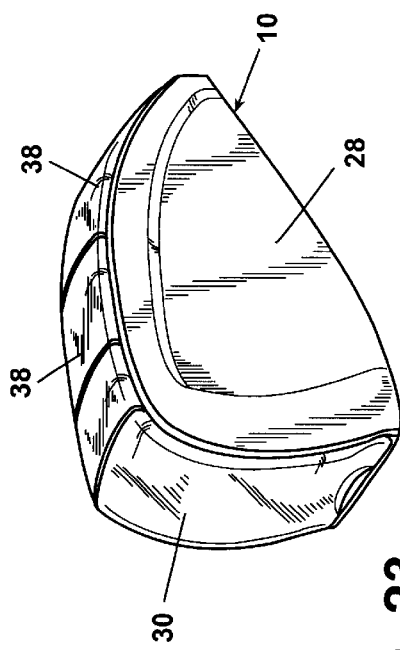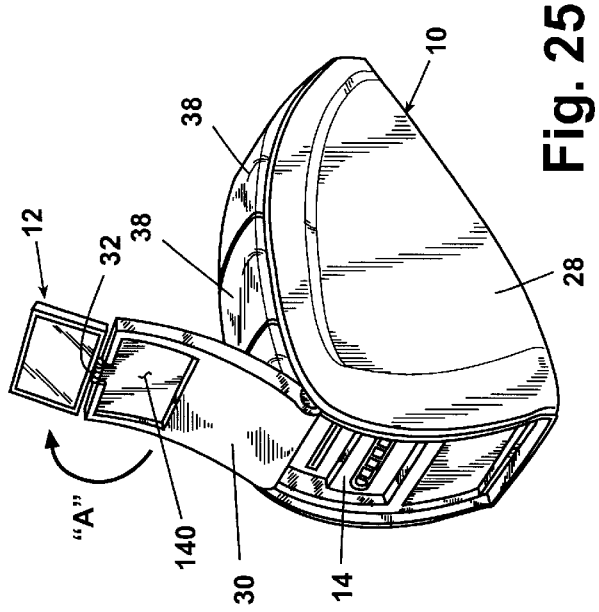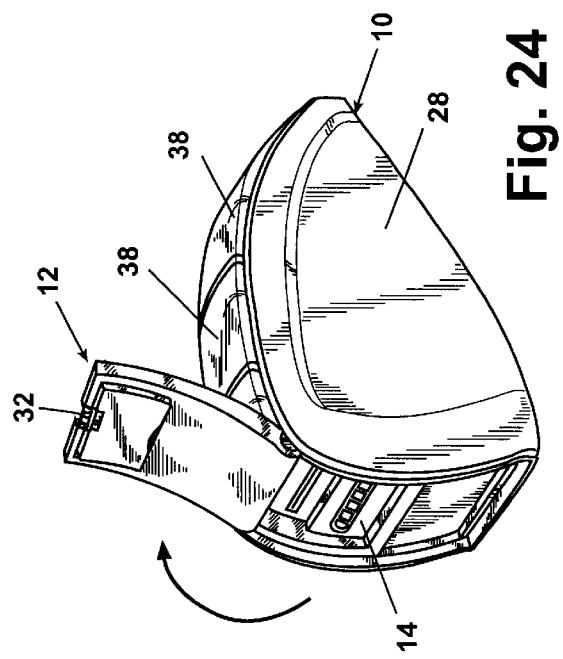

VEHICULAR CONSOLE WITH ADJUSTABLY-MOUNTED VIDEO DISPLAY UNIT

CROSS-REFERENCE TO RELATED APPLICATION

This application claims the benefit of U.S. Provisional Application No. 60/161,866, filed on Oct. 27, 1999.

BACKGROUND OF THE INVENTION

1. Field of the Invention

The invention relates to a console for a passenger compartment of a vehicle having an adjustably-mounted video display unit mounted thereto. In one embodiment, the video display unit can be extended from the interior of the console and positioned in a variety of orientations for viewing by passengers residing in the vehicle interior.

2. Description of the Related Art

Passenger vehicles are including an increasing number of amenities to increase an operator's and his/her passenger's use and enjoyment of a passenger vehicle. Passenger vehicles such as minivans are even including television-type video display units for viewing while riding in the passenger vehicle. These video display units are often interconnected to recording and playback devices, such as video cassette recorders and digital video disc (DVD) units, so that occupants of the passenger vehicle may enjoy movies and other prerecorded programs as well as live television broadcasts, such as through the use of a conventional antenna or satellite-dish device.

The size of these video display units is important to provide as large a picture as possible for the occupants of the passenger vehicle while minimizing the storage space required therefor. In order to economize storage space as well as provide an optimum video display unit diagonal viewing size, several attempts have been made to mount a video display unit within a passenger compartment of a vehicle.

One of these attempts has involved mounting a video display unit to a "headliner" portion of the roof of the passenger compartment of the vehicle in an overhead console. For example, U.S. Pat. No. 5,822,023 to Suman et al., U.S. Pat. No. 5,927,784 to Vitito, U.S. Pat. No. 5,775,762 Vitito disclose an overhead console for a passenger vehicle including a liquid crystal display (LCD) unit mounted in the overhead console. Further, U.S. Pat. No. 5,940,120 to Frankhouse et al. discloses a video display unit mounted within a vanity console located in a flip-down visor in a vehicle passenger compartment. These overhead console locations have prompted ergonomic-related complaints from occupants of passenger vehicles due to an undesirable viewing angle toward the roof of the passenger compartment of the vehicle, higher manufacturing and installation costs due to the mounting to an overhead console, sun roofs are extremely difficult if not impossible to install due to obstruction by the LCD unit, harnessing wires and routing cabling to the overhead console is difficult, and this type of video display unit often blocks the rearview mirror sight line.

Other attempts to locate a video display unit within a passenger compartment of a vehicle have attempted to locate the video display unit within a rear panel of one or both of the front seats of the vehicle passenger compartment. For example, U.S. Pat. No. 5,842,715 to Jones discloses a vehicular entertainment system wherein a video display unit is mounted to a front seat by straps wrapped around the seat. This type of mounting is often undesirable due to complaints from occupants of the rear seats of the vehicle who are seated laterally from the video display unit and must either strain to view the video display unit screen panel or accept an undesirable line of sight often resulting in undesirable viewing of the video display unit. Further, to the extent the passenger vehicle comprises a typical minivan which has multiple rows of rear seats, those located in the rearwardmost row of seats in the minivan are often unable to view the video display unit mounted to the rear of one of the forwardmost seats in the vehicle.

Other attempts to optimally locate a video display unit within a passenger compartment of a vehicle interior have resulted in the retractable mounting of the video display unit within a console typically mounted between a pair of front seats in the passenger compartment of the vehicle interior. For example, U.S. Pat. No. 5,311,302 to Berry et al., U.S. Pat. No. 5,338,081 to Young et al., and U.S. Pat. No. 5,397,160 to Landry disclose vehicle consoles having video display units mounted thereto. Often, passengers of these types of vehicles complain of these console-mounted video display units because the vertical height of the video display unit is too low. It has been found that viewers who are seated in rear seats of a passenger compartment of a vehicle and who often restrict their line of vision to an angularly downward direction often are susceptible to motion sickness in the rear seats of a vehicle. Further, these types of console-mounted video display units are often very difficult to be viewed by passengers in the front seats of the passenger compartment of a vehicle.

SUMMARY OF THE INVENTION

Thus, it is believed that the current invention overcomes limitations of the prior art by providing a console-stored video display unit which can be extended to a viewing position wherein the video display unit is adjustable both about a vertical pivot axis as well as a horizontal pivot axis to allow tilting and other reorientation of the video display unit to provide for optimal viewing results by occupants of the passenger compartment of a vehicle interior. In addition, the video display unit, when extended to the viewing position, can be vertically adjusted to place the video display unit in an optimal viewing height for whatever the ergonomic considerations happen to be for occupants of the vehicle interior. The display unit also includes a console interface portion forming a smooth, aesthetically-pleasing surface for the console when the display unit is positioned in a retracted position within the console.

In one aspect, the invention relates to a console adapted to be mounted within a passenger compartment in a vehicle comprising a body having an outer surface and defining at least one storage compartment with an opening in the outer surface, a first cover pivotally mounted to the body between a closed position and an open position, the cover being in register with the opening in the closed position and forming a flush outer appearance with the outer surface. The body further has a recess formed in the outer surface adjacent the storage compartment opening. A bracket is movably mounted within the recess between a retracted position wherein the bracket is stowed within the recess and an extended position wherein the bracket extends beyond the outer surface. A video display unit is mounted to the bracket for movement with the bracket, wherein at least one of the bracket and the video display unit includes a console interface portion forming a flush outer appearance with the outer surface when the bracket is in the retracted position. The video display unit being positioned ergonomically for viewing by occupants of the vehicle when the bracket is located in the extended position. A video signal source is operably interconnected to the video display unit.

The bracket can include a seat having a detent arm actuatable by a release button. The video display unit can be removably mounted to the bracket by the detent arm when the release button is pressed. The video source can comprise a playback device mounted within the console. The video display unit can be interconnected to the video source by a cable. The video display unit can include a receiver and the video source can include a transmitter adapted to transmit a multimedia signal to the video display unit receiver. A wireless interconnection is thereby formed between the video source transmitter and the video display unit receiver.

A push-push mechanism can be formed between the bracket and the body. An occupant of the vehicle can thereby depress and release the console interface portion to move the video display unit between the retracted and extended positions via the bracket. The video display unit can be pivotally mounted to the bracket for rotation between a range of ergonomic viewing angles. A detent mechanism can be formed between the bracket and the video display unit for retaining the video display unit in a particular preselected discrete rotational position relative to the bracket.

The console can include at least one jack operably interconnected to the video display unit for receiving a signal from an alternate video source. The alternate video source can be a videocassette player, a gaming unit or a television signal, for example.

Other objects, features, and advantages of the invention will be apparent from the ensuing description in conjunction with the accompanying drawings.

BRIEF DESCRIPTION OF THE DRAWINGS

In the drawings:

FIG. 1 is a perspective view of a first embodiment of a console with an adjustably-mounted video display unit according to the invention;

FIG. 2 is a perspective view of the console of FIG. 1 with a cover of the console open to a first position exposing a video display unit mounted to an underside portion of the cover;

FIG. 3 is a perspective of the console of FIGS. 1–2 showing the video display unit pivoted to an upward viewing position for occupants of the vehicle passenger compartment rearward of the console;

FIG. 4 is a perspective view of a second embodiment of the console according to the invention;

FIG. 5 is a perspective view of the console of FIG. 4 showing a cover on the console opened to expose a recording/playback device mounted within the console and an adjustably-mounted video display unit extended therefrom;

FIG. 8 is a fourth embodiment of the console according to the invention;

FIG. 9 is a fragmentary, perspective view of the console of FIG. 8 showing a video display unit pivotally mounted thereto in a viewing position;

FIG. 10 is a cross-sectional view taken along lines 10—10 of FIG. 9 showing components internal to the video display unit for maintaining the video display unit in a retracted position;

FIG. 11 is a cross-sectional view taken along lines 11—11 of FIG. 9 showing the video display unit and the internal components for maintaining the video display unit in an extended position;

FIG. 12 is a fifth embodiment of the console according to the invention showing a cover therefor pivoted to an open position and a video display unit having a vertically-adjustable mounting assembly thereon;

FIG. 13 is a fragmentary top plan view taken along lines 13—13 of FIG. 12 showing a user's hand pinching a spring clip located on the video display unit which aligns a detent located on a distal end of the spring clip within several indentations to maintain a video display unit in a vertically adjusted position;

FIG. 14 shows a sixth embodiment of the console according to the invention;

FIG. 15 shows a cover for the console of FIG. 14 pivoted to an open position and containing a bracket with a slidably-inserted video display unit interconnected to the recording/playback device located on the console by a retractable cable;

FIG. 16 shows the bracket and video display unit assembly mounted to a rearward portion of a headrest for a passenger seat for a vehicle interior wherein the cable has been extended from the console and interconnects the video display unit to the recording/playback device on the console;

FIG. 17 is a seventh embodiment of the console according to the invention showing a video display unit pivotally mounted thereto and contained within the interior of the console according to the invention;

FIG. 18 is a perspective view of the console of FIG. 17 showing several covers pivoted to open positions revealing a recording/playback device, the video unit pivoted to a viewing position, a writing pad, and a drawer/container holder which are accessible to occupants of the vehicle interior;

FIG. 19 is an eighth embodiment of a console according to the invention;

FIG. 20 is a schematic view of the console of FIG. 19 showing a video display unit pivotal between a first position stored within the console and a second position viewable by occupants of the vehicle interior;

FIG. 21 shows the video display unit pivoted outwardly from a slot located within the console of FIG. 19 and vertically adjustable along a shaft and pivotally adjustable about a joint to provide optimal viewing adjustments for occupants of the vehicle interior;

FIG. 23 is a perspective view of a tenth embodiment of a console with an adjustably-mounted video display unit according to the invention;

FIG. 24 is a perspective view of the console of FIG. 23 with a rearwardly-facing cover of the console open to a first position exposing a video display unit mounted to an underside portion of the cover;

FIG. 25 is a perspective of the console of FIGS. 23–24 showing the video display unit pivoted to an upward viewing position for occupants of the vehicle passenger compartment rearward of the console;

DESCRIPTION OF THE PREFERRED EMBODIMENT

Figure 7:
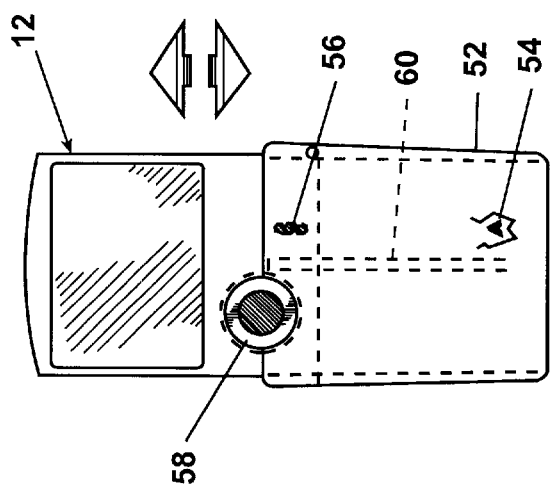
FIG. 7 is a front elevational view of the video display unit for the console of FIG. 6 showing a mounting assembly on the video display unit for maintaining the video display unit in an adjusted position relative to the console.

Several embodiments of a console 10 having a stored video display unit 12 therein according to the invention are shown in the drawings. It will be understood that, with respect to all embodiments of the invention described herein and all reasonable equivalents thereof, the console 10 according to the invention includes an inventive adjustably-mounted video display unit 12 as well as many optional features.

For example, the console 10 can be removably mounted within the vehicle interior so that the video display unit and any optional recording/playback devices (shown by example by reference numeral 14 in the drawings) can be taken with the occupants of the vehicle interior when leaving the vehicle. The console 10 can include electrical interconnections preferably located around the base portion of the console 10 for optionally interconnecting electrical, networking, data, video signal, or cellular telephone signals to appropriately-wired circuits located within the console 10.

A front and/or rear control panel (shown by example by reference numeral 16 in the drawings) can be provided on the console 10 for operating the recording/playback device 16, other controls for the video display unit 12, etc. The console 10 can also be provided with a storage chamber 18 as is conventionally provided in vehicle passenger compartment consoles known in the art. Further, the console 10 can be provided with a cellular telephone mounting portion (shown by reference numeral 20 in the drawings) adapted to support a cellular telephone 22. The console 10 can also be provided with one or more container holders 24 which are conventionally known for supporting a beverage container in a stable manner during operation of the vehicle. Other features of the console 10 can include a writing pad 26 as is also well known in the art.

The console 10 with the adjustably-mounted video display unit 12 is a modular console system which incorporates high-quality electronic components, stores the components in a minimal amount of space, and provides important ergonomic benefits to occupants of the vehicle interior by adjustably mounting the video display unit 12 about several pivot axes as well as in a vertically-adjustable manner to allow the height, angle, and pivot of the video display unit 12 to be easily adjusted by occupants of the vehicle interior without regard to the location of the user in the front and/or rear seats as well as the age, height, or vision ability of the occupants.

Various embodiments for adjustably mounting and deploying the video display unit 12 within the console 10 will now be described with respect to the drawings. It will be understood that reference numerals 10–26 are used commonly across all embodiments of FIGS. 1–32 to describe components which can be used in all embodiments shown in these drawings. Further, it will be understood that components 14–26 are optional components which can be used with any/or all of these embodiments without departing from the scope of the invention which relates to the adjustable mounting of the video display unit 12 within the console 10.

A first embodiment of the console 10 according to the invention is shown in FIGS. 1–3 and comprises a console body 28 having at least one pivotal cover 30 located along an upper surface thereof. FIG. 1 shows the cover 30 located in a first closed position and FIGS. 2–3 show the cover 30 pivoted to a second, open position wherein the internal storage chamber 18 of the console is revealed. An underside portion of the cover 30 is provided with a video display unit 12 pivotally mounted to the underside of the cover 30 by a pivot joint 32. The pivot joint 32 is mounted at a first portion to the video display unit 12 and at a second portion to the underside of the cover 30 and acts as a damped hinge to allow the video display unit 12 to be pivoted from a first stored position against the underside of the cover 30 (FIG. 2) to a second viewing position pivoted upwardly about the arrow shown as "A" (FIG. 3).

It is contemplated that the video display unit 12 can include video driver software as is conventionally known in the art to maintain a vertically upright image on the video display unit screen regardless of whether the video display unit 12 is positioned in the first stored position as shown in FIG. 2 or the second upwardly inverted position shown in FIG. 3. Thus, whether occupants of the vehicle interior are located forwardly, rearwardly or laterally of the console 10, the image displayed on the video display unit 12 is always oriented correctly. These types of video drivers typically operate by including a sensor (not shown) located within the video display unit which senses the orientation of the video display 12 and adjusts the signal to the screen of the video display unit corresponding thereto.

A second embodiment of the console 10 according to the invention is shown in FIGS. 4–5. The console 10 shown in FIG. 4 comprises at least a console body 34 including at least one pivotally-mounted cover 36 adjacent an upper portion of the console 10. Additional covers 38 and/or drawers 40 can be provided as is conventional with vehicle consoles for passenger compartments. The video display unit 12 is mounted within the storage chamber 18 of the console 10 and is provided with first and second adjustment assemblies 42 and 44, respectively. A first adjustment assembly 42 comprises a telescoping shaft formed by a cylinder 46 mounted to the console 10 having an axially extendable piston 48 located therein which mounts the video display unit at a distal of the piston 48. Axial movement of the piston 48 relative to the cylinder 46 adjusts the vertical position of the video display unit 12 relative to the console 10. The second adjustment assembly 44 is located at a distal end of the piston 48 and comprises a pivot joint 50 which allows the video display unit to pivot with respect to the first adjustment assembly. Thus, the first and second adjustment assemblies 42 and 44 provide at least two degrees of adjustability in a vertically-movable and pivotal sense to allow greater adjustments of the video display unit 12 with respect to the console 10. Further, the cylinder 46 and piston 48 can be rotatably mounted to one another so that a third degree of freedom can be imparted to the video display unit to further provide adjustment capabilities thereto. The video display unit 12 can be interconnected in a conventional manner to a recording/playback device 14 located within the console. Opening the cover 36 on the console 10 exposes the control panel 16 for the recording/playback device 14 so that it may be actuated by an occupant of the passenger compartment of the vehicle interior.

Figure 6:
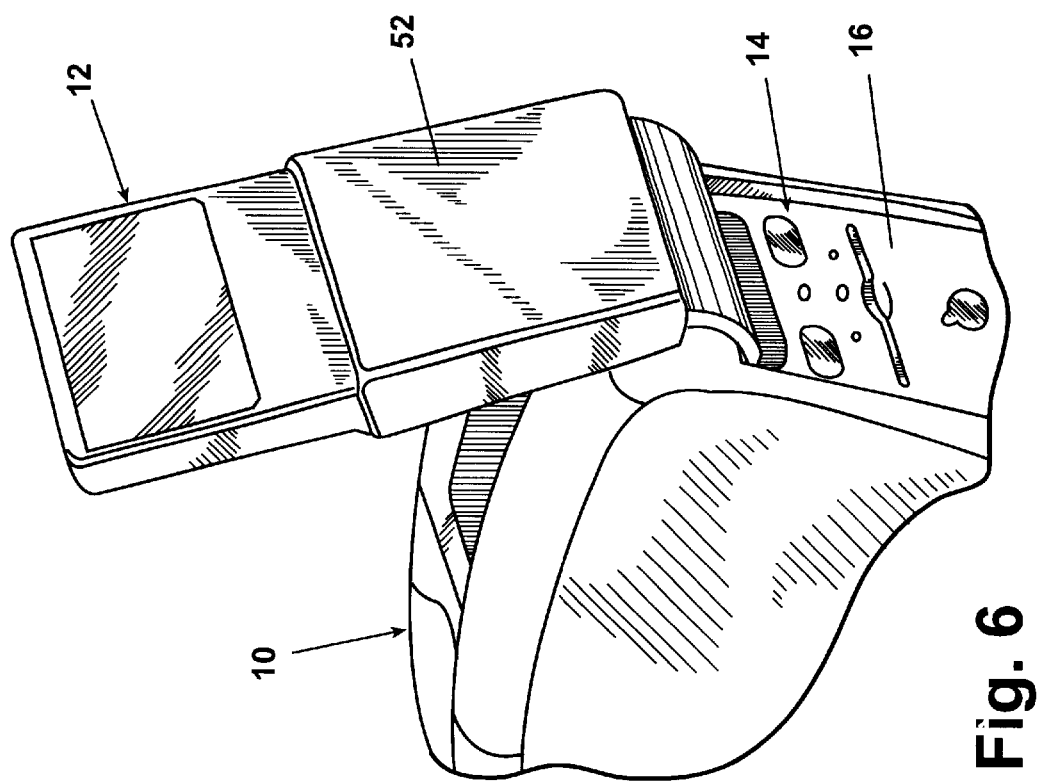
FIG. 6 is a third embodiment of the console according to the invention showing a video display unit pivotally mounted to the console and having a slidable portion located on the video display unit so that a screen therefor can be further adjusted.

A third embodiment of the console 10 according to the invention is shown in FIGS. 6–7. It will be understood that the console 10 shown in FIG. 6 has at least one pivotally mounted cover 36 for accessing the storage chamber 18 as in the previous two embodiments. The video display unit 12 is slidably mounted within a housing 52 mounted to the console 10 for continuous adjustment between a stored position wherein the video display unit 12 is located within the housing 52 and a fully extended position wherein the video display 12 is axially extended from the housing 52.

FIG. 7 shows examples of the components for vertically adjusting the video display unit 12 with respect to the housing 52. For example, a push-push mechanism 54 is located adjacent a base portion of the housing 52 which cooperates with a flange 56 on the video display unit 12 to selectively lock and unlock the video display unit 12 from engagement with the housing 52. Typically, these push-push mechanisms 54 operate to allow a user to simply depress the video display unit 12 with respect to the housing 52 which disengages the flange 56 from the push-push mechanism 54 and cooperates with a spring (not shown) disposed between the video display unit 12 and the housing 52 which thereby extends the video display unit 12 with respect to the housing 52.

The third embodiment shown in FIGS. 6–7 also includes a second example of the vertically adjustable nature of the video display 12 with respect to the console 10. For example, a rotatable gear 58 is provided on the video display unit 12 which cooperates with an elongated rack gear 60 located on the housing 52 whereby the extension of the video display unit with respect to the housing 52 can be controlled by the interengagement of teeth on the gear 58 with teeth on the rack 60. Because the housing 52 is preferably pivotally mounted to the console 10, the video display unit is vertically adjustable with respect to the console 10 to a vertically adjustable mounting to the housing 52.

A fourth embodiment of the console 10 according to the invention is shown in FIGS. 8–11. The console 10 shown in FIG. 8 preferably includes at least one pivotally mounted cover 62 wherein the video display unit 12 is mounted to the console 10 via a housing 64. The cover 62 and housing 64 are preferably mounted to the console 10 as in the third embodiment discussed above. FIGS. 10–11 show an alternate arrangement of vertically and adjustably mounting the video display unit 12 with respect to the housing 64. A push-push mechanism 66 is mounted to the video display unit 12 which interacts with a flange 68 in the same manner as in the previous embodiment. Further, a constant force retractable spring 70 is mounted between the video display unit 12 and the housing 64 whereby, in the stored position shown in FIG. 10, the spring 70 is held in an extended and tensioned position by the engagement of the push-push mechanism 66 on the video display unit 12 with the flange 68 located on the housing 64. When the push-push mechanism 66 is disengaged, the spring 70 retracts and extends the video display unit 12 from the housing 64. A viscously-damped gear 72 can also be provided on the video display unit 12 which preferably coacts with rails (not shown) on the housing 64 to control the velocity with which the video display unit 12 is extended from the housing 64. The video display unit 12 can be returned within the housing 64 by depressing the video display unit so that it is withdrawn within the housing 64 until the push-push mechanism 66 engages the flange 68. The video display unit 12 is thereby returned with the console 10 by pivoting the cover 62 to the closed position as shown in FIG. 8.

A fifth embodiment of the console 10 according to the invention is shown in FIGS. 12–13. The console 10, as in the previous embodiments, includes at least one pivotal cover 74 which exposes the storage chamber 18 of the console 10. The video display unit 12 is pivotally mounted upon an elongated shaft 76 by a pivot joint 78 between a stored position located within the storage chamber 18 and a use position as shown in FIG. 12 wherein the shaft 76 is extended beyond the storage chamber 18 to a generally upright position.

The shaft 76 includes a series of indentations 80 which cooperate to receive a spring clip 82 located on the video display unit 12. The video display unit 12 also preferably includes an elongated recess 84 which is adapted to slidably receive the shaft 76 wherein the spring clip 82 includes a detent 86 on an inner face 88 thereof whereby the detent 86 is located within one of the series of indentations 80 to selectively mount the video display unit 12 in a vertically adjusted position along the shaft 76 in any of several locations. The spring clip 82 is preferably pivotally mounted at 90 and biased so that the detent 86 is urged within one of the series of indentations 80 by a spring (not shown). A user 92 can thereby grip the spring clip as shown in FIG. 13 to pivot the detent 86 away from the series of indentations 80 to further vertically adjust the video display unit 12 along the shaft 76.

FIGS. 14–16 show a sixth embodiment of the console 10 according to the invention including at least one pivotal cover 94 according to the invention which mounts a housing 96 which is adapted to receive the video display unit 12 in a slidable mounting fashion. The housing 96 includes a gap 98 which is aligned with a cable 100 interconnecting the video display unit with the recording/playback device 14 located within the interior of the console 10. The cable 100 is preferably mounted to a retractable, slack-withdrawing housing which winds excess of the cable 100 within a spool (not shown) within the interior of the console 10.

Thus, the video display unit 12 can be slidably removed from the bracket 96 all the while withdrawing the cable 100 from within the housing 12. In this embodiment, the video display unit 12 is detachable from the housing 96 and can be hung via a handle strap 102 provided on the video display unit 12 so that the handle/strap 102 can be provided around a headrest 104 on a vehicle seat 106 to mount the unit 12 to the vehicle seat 106. The video display unit 12 can be returned to the console 10 by merely detaching the handle/strap 102 from the vehicle seat 106, returning the video display unit 12 to register with the housing 96, inserting the video display unit 12 into the housing 96 and returning the cover 94 to its closed position shown in FIG. 14.

A seventh embodiment of the console 10 according to the invention is shown in FIGS. 17–18 wherein the video display unit 12 is mounted upon a shaft 108 and, in turn, to the console 10 by a pivot joint 110. In this embodiment, the video display unit 12 and its attached shaft 108 and joint 110 occupy a vertical planar portion of the storage chamber 18 of the console 10, leaving an opposite chamber 112 available for storage. As shown in FIG. 18, the shaft 108 mounted to the video display unit 12 can be pivoted about the pivot joint 110 to an extended position after pivoting a cover 114 to an open position. The shaft 108 can be rotatably mounted between the pivot joint 110 into the video display unit 12 to provide for additional adjustability.

An eighth embodiment of the console 10 according to the invention is shown in FIGS. 19–21. In this embodiment, the console 10 includes a first cover 116 concealing the recording/playback device 14 and its control panel 16 and a second cover 118 which conceals the video display unit 12 mounted within the storage chamber 18 of the console 10. In this embodiment, the video display unit 12, as shown in FIGS. 20–21, is mounted to the console 10 by a shaft 120 via a universal pivot joint 122. Further, at the opposite end of the shaft 120, the video display unit 12 is mounted thereto by a second pivot joint 124. Further, a push-push mechanism (not shown) is mounted to the video display unit 12 via the shaft 120 whereby the video display unit 12 is stored in the console 10 by the push-push mechanism and released therefrom by the push-push mechanism. The first and second pivots 122 and 124 allow several degrees of adjustability for the video display unit 12 with respect to the console 10. Further, the shaft 120 can be provided with a telescoping portion (not shown) which allows for vertical adjustment of the video display unit 12 with respect to the console 10. This telescoping portion can comprise a similar cylinder-piston arrangement as discussed with respect to the previous embodiment above.

Figure 22:
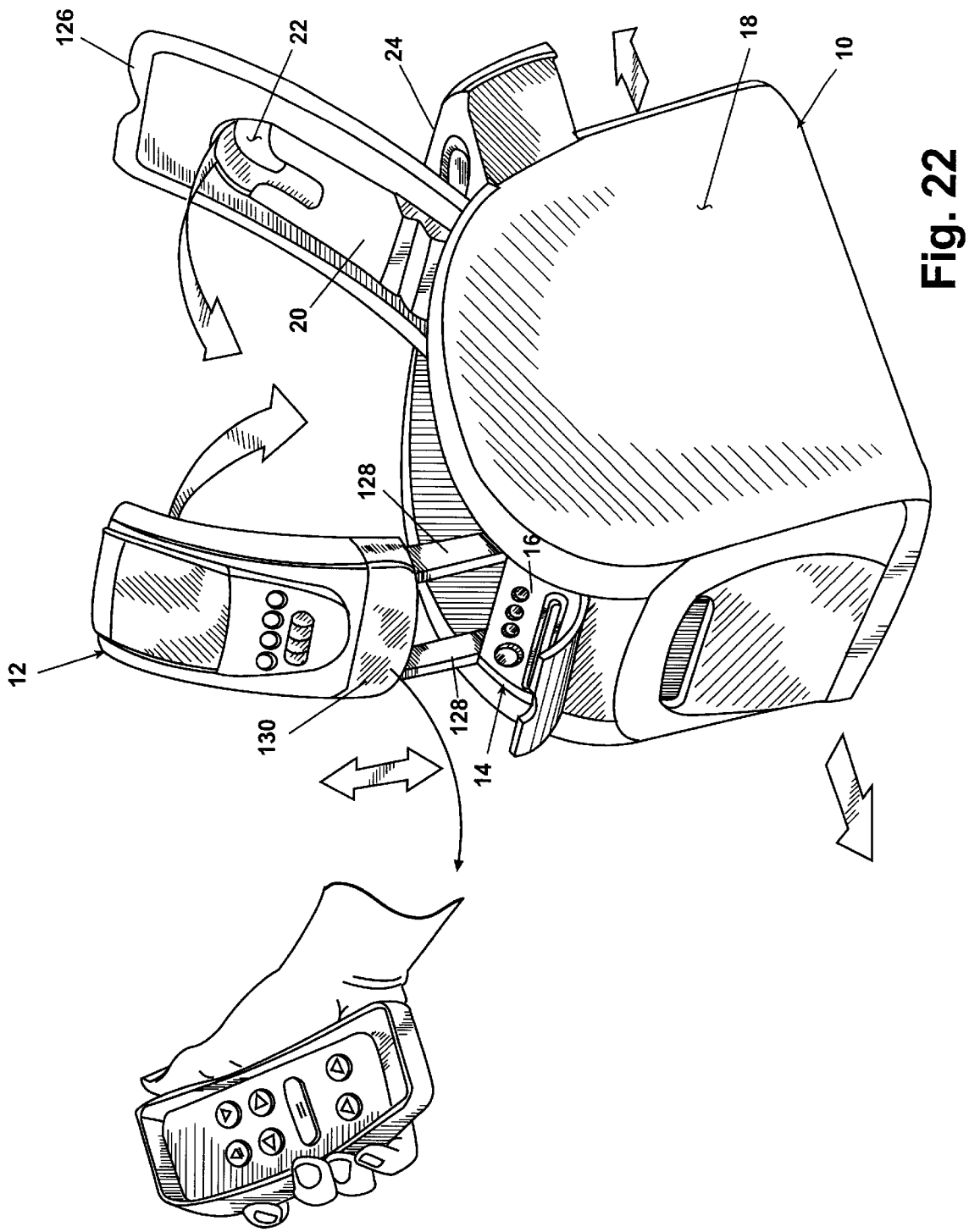
FIG. 22 is a ninth embodiment of the console according to the invention showing a video display unit pivotal with respect to the console, a cover revealing a recording/playback device, a cover functioning as both a conceal for the video display unit as well as a cellular telephone or remote control holder located on the underside of the cover, wherein the console also has conventional container holder and drawer devices as well.

A ninth embodiment of the console 10 according to the invention is shown in FIG. 22. The console 10 includes at least one pivotally-mounted cover 126 which conceals the video display unit 12. The video display unit 12 is pivotally mounted to the console 10 upon a pair of support rails 128 such as by a gas-assist pivot joint (not shown) located at lower ends of the support rails 128. The gas-assist pivot joint allows for a controlled and damped movement of the video display unit 12 between the stored and extended positions. The support rails 128 also serve to vertically and adjustably mount the video display unit 12 to the console 10 as the support rails 128 are received within suitable apertures in a housing 130 for the video display unit 12 so that a desirable degree of vertical adjustability can be achieved by vertically urging the video display unit 12 upwardly or downwardly with respect to the console 10 along the support rails 128.

A tenth embodiment of the console 10 according to the invention is shown in FIGS. 23–25 and comprises a console body 28 having at least one pivotal cover 30 located along a rearwardly-facing surface thereof. FIG. 23 shows the cover 30 located in a first closed position and FIGS. 24–25 show the cover 30 pivoted to a second, open position wherein the recording/playback device 14 and its associated control panel 16 of the console 10 are revealed. The recording/playback device 14 can be a top-load DVD player and the control panel 16 can be any suitable control panel, such as a series of touch buttons, a removable remote control, etc. An underside portion of the cover 30 is provided with a video display unit 12 pivotally mounted to the underside of the cover 30 by a pivot joint 32. The pivot joint 32 is mounted at a first portion to the video display unit 12 and at a second portion to the underside of the cover 30 and can act as a damped hinge to allow the video display unit 12 to be pivoted from a first stored position against the underside of the cover 30 (FIG. 24) to a second viewing position pivoted upwardly about the arrow shown as "A" (FIG. 25). A recess 140 can be provided in the underside of the cover 30 to provide a storage location for the video display unit 12 so that the video display unit 12 does not occupy an undue amount of space within the console 10.

Figure 27:
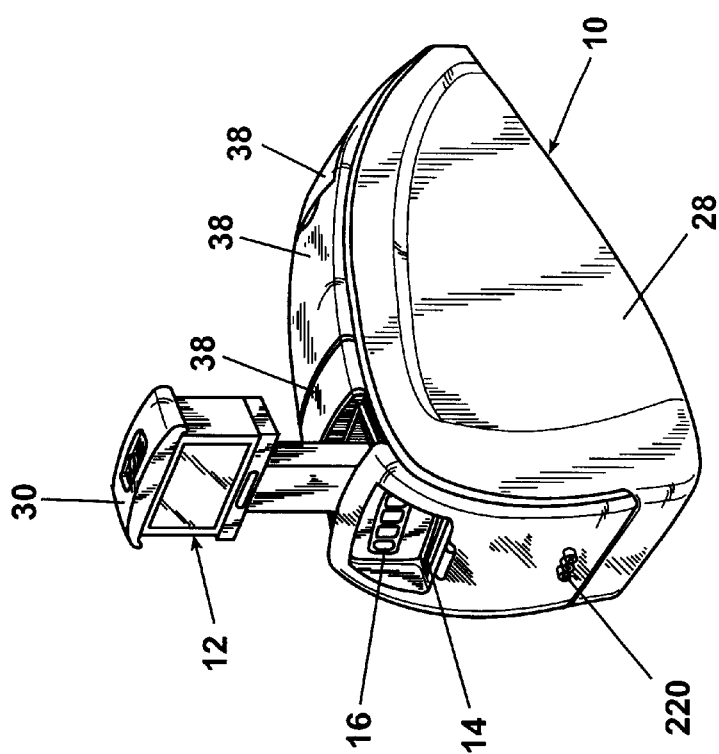
FIG. 27 is a perspective view of the console of FIG. 26 wherein a video display unit having an aesthetically-pleasing trim piece mounted thereto has been moved from a retracted position within the console to an extended position located a spaced vertical distance from the console.
Figure 26:
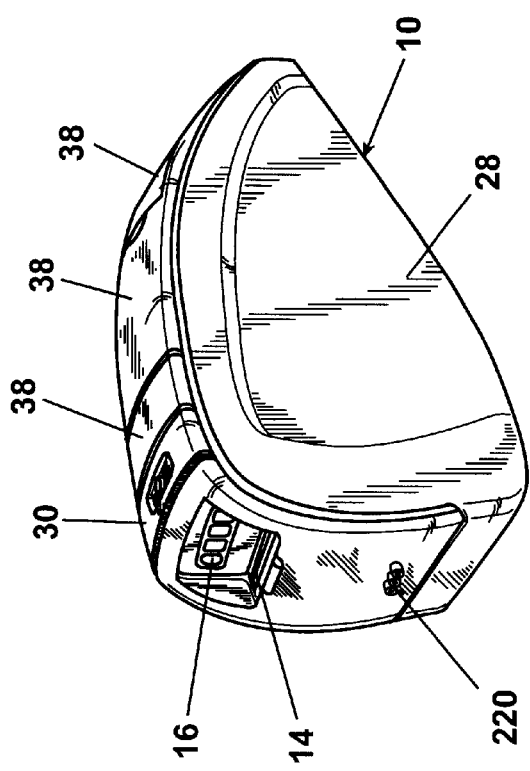
FIG. 26 is a perspective view of an eleventh embodiment of a console with an adjustably-mounted video display unit according to the invention.

An eleventh embodiment of the console with an adjustably-mounted video display unit is shown in FIGS. 26 and 27. The console 10 includes a body 28 having a display unit cover 30 which conceals a display unit 12 telescopingly-mounted within the console 10 by a push-push mechanism whereby a user presses the video display unit cover 30 in a downward fashion relative to the console 10 to release the video display unit 12 in an upward fashion so that it assumes the extended position shown in FIG. 27. The console 10 also includes other covers 38 which conceal other storage areas within the console 10 as is well known in the art. In addition, stereo jacks 220 can be provided on a rear surface of the console 10 as shown in FIGS. 26–27 for interconnecting an alternate video source than the recording/playback device 14 such as a video game unit, video cassette recorder, and the like.

Figure 28:
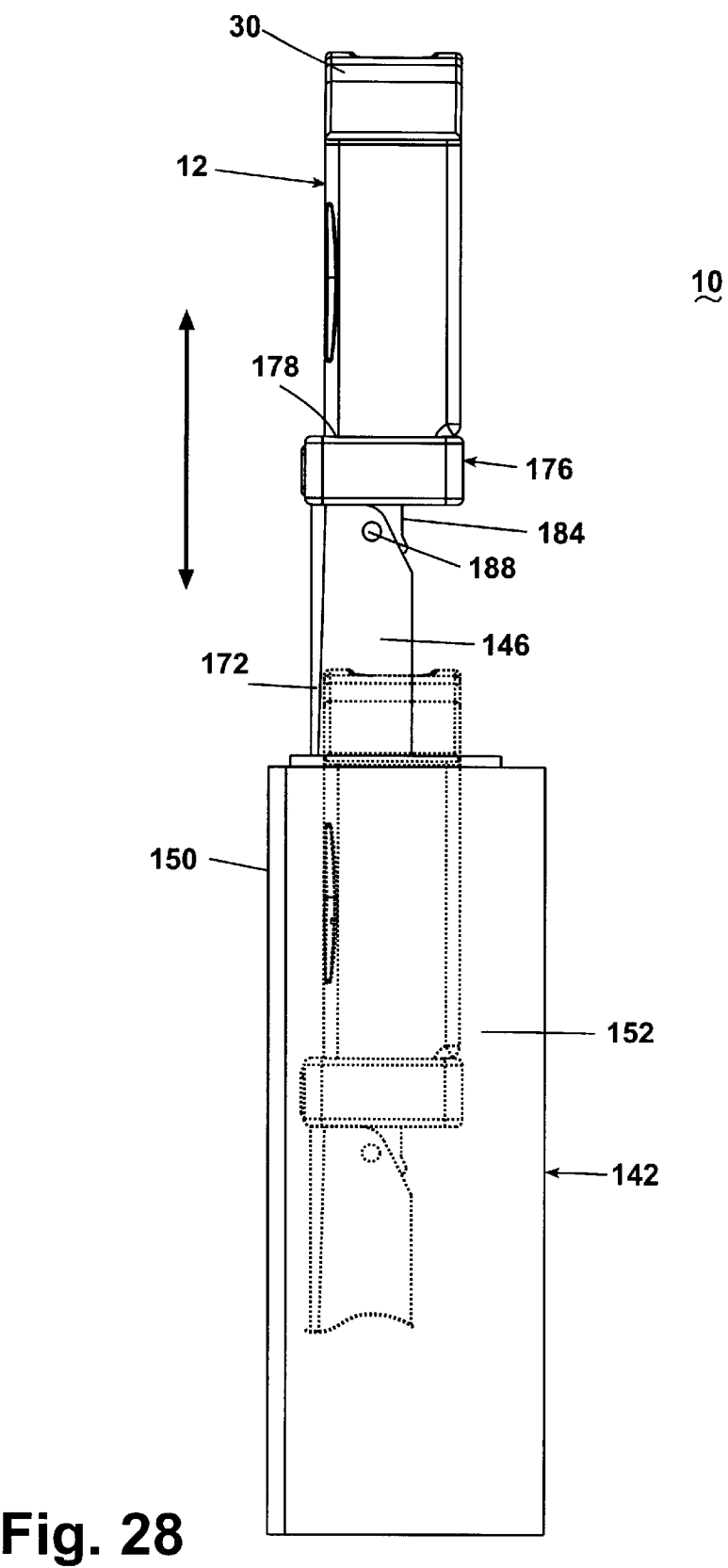
FIG. 28 is a side view of a housing for any of the consoles of the preceding embodiments of FIGS. 1–27 having the adjustably-mounted display unit mounted therein for movement between a retracted position within the housing and an extended position vertically-spaced from an upper edge of the housing.
Figure 29:
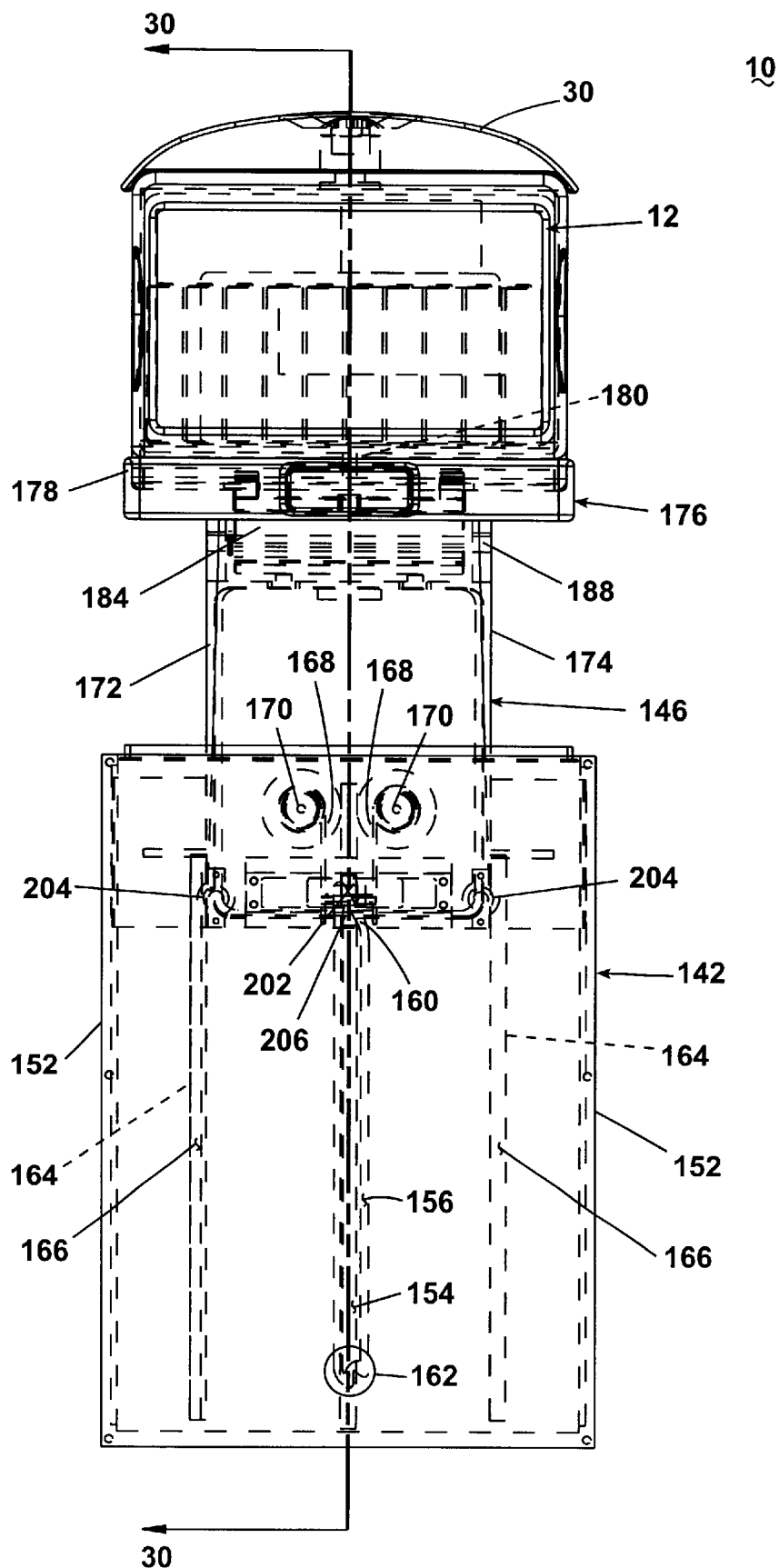
FIG. 29 is a front elevational view of the housing and adjustable display unit of FIG. 28.
Figure 30:
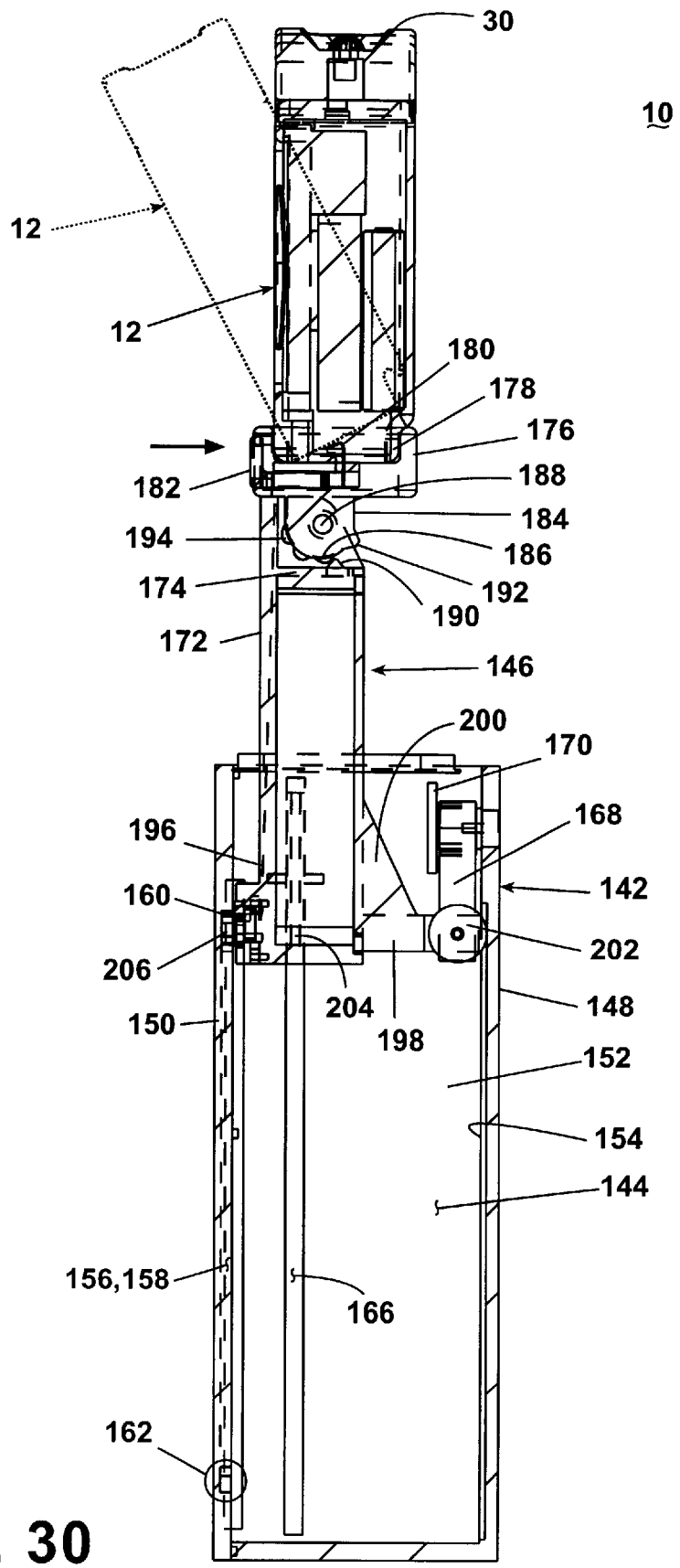
FIG. 30 is a cross-sectional view taken along lines 30—30 of FIG. 29.

FIGS. 28–30 disclose an adjustably-mounted video display unit 12 within a housing 142 mounted for movement between a retracted position wherein the video display unit 12 is substantially within the housing 142 and an extended position wherein the video display unit 12 is positioned in a vertically-spaced relationship with respect to the housing 142. It is contemplated that the housing 142 is positioned within any of the embodiments of the console 10 described herein so that the housing 142 and the video display unit 12 can be extended from the console 10 such as in the eleventh embodiment shown in FIGS. 26–27 and in the previous embodiments shown in FIGS. 1–25. It will be understood that the adjustably-mounted video display unit 12 and the housing 142 are shown as an example of a way by which a video display unit 12 can be positioned vertically with respect to a console 10 and that the assembly shown in FIGS. 28–30 is an example of the way by which the video display unit 12 can be vertically and movably mounted to a console 10.

The housing 142 comprises a generally vertical and rectangular housing having an open interior 144 adapted to receive the video display unit 12 and an associated bracket 146 therefor. The housing 142 has a forward wall 148, a rearward wall 150 and sidewalls 152. The forward wall 148 has a first guide groove 154 extending generally along a vertical midline of the forward wall 148. The rearward wall 150 has a push-push mechanism defined in part by a release groove 156 located adjacent one side of the vertical midline of the rearward wall 150 and a return groove 158 in an opposed relationship to the vertical midline of rearward wall 150. An angular transfer groove 160 interconnects an upper end of the release groove 156 with an upper end of the return groove 158 and a sinuous retainer portion 162 interconnects the lower ends of the release groove 156 and the return groove 158. Lateral brackets 164 are positioned within the open interior 144 of the housing 142 and spaced in generally parallel relationship to the sidewalls 152 which define vertically-extending second guide grooves 166 therein. A pair of leaf springs 168 are mounted on bearings 170 positioned on the forward wall 148 of the housing 142.

The bracket 146 comprises an elongated member 172 having an upper end 174 adapted to pivotally mount a bracket 176 holding the video display unit 12. It should be noted that an upper portion of the bracket 176 is provided with the cover 30 which preferably has an upper surface corresponding to an upper surface of the console 10 and its associated other covers 38 so that the upper surface of the console 10 has a generally smooth and flush outer appearance when the cover 30 and the other covers 38 are in a closed position.

The bracket 176 comprises a seat 178 provided with a spring-biased detent arm 180 that is actuated by a button 182 operably mounted to the detent arm 180 so that, when the button 182 is depressed, the detent arm 180 moves with the button 182.

A cam flange 184 extends downwardly from an underside of the bracket 176 and has an outer rounded cam surface 186 thereon and a pivotal mounting 188 which is pivotally mounted to the upper end 174 of the elongated member 172 so that the cam flange 184, and particularly the cam surface 186 thereof, abuts a cam 190 located on the upper end 174 of the elongated member 172.

Thus, when the pivotal mounting 188 interconnects the bracket 176 to the upper end 174 of the elongated member 172, the cam surface 186 of the cam flange 184 abuts the cam 190 so that pivotal movement of the bracket 176 follows the abutment path defined by the interaction between the cam surface 186 and the cam 190. A stop 192 can be defined on the cam flange 184 as a protrusion 192 which prevents further rotation of the bracket 176 relative to the upper end 174 of the elongated member 172. Further, several indentations 194 can be provided on the cam surface 186 to provide several discrete rotational stopping locations for angular positioning of the bracket 176, and necessarily for the attached video display unit 12, relative to the upper end 174 of the elongated member 172.

It will be understood that the video display unit 12 includes suitable apertures (not shown) on a lower surface thereof which, upon the angular insertion of the video display unit 12 into the seat 178 defined by the bracket 176, allow the video display unit 12 to be removably mounted within the seat 178 and thereby attached to the bracket 176. The video display unit 12 can be released by depressing the button 182 which moves the detent arm 180 out of engagement with the apertures on the lower surface of the video display unit 12 allowing the removal of the video display unit 12 from attachment to the bracket 176. In this manner, the video display unit 12 can be used as a hand-held unit within the vehicle in which the console 10 resides.

The video display unit 12, when used in this manner, can be interconnected to the video signal source as described with respect to the previous embodiments by a cable 100 such as that shown in FIGS. 15–16, but preferably is a wireless unit including a wireless receiver in the video display unit 12 and an associated transmitter located within the console 10 which is attached to a video source such as the recording/playback unit 14 or another video source such as a television antenna attached to the vehicle, a satellite transmitter and the like. The video display unit 12 can thereby be attached, removed and reattached by engagement of the apertures in the lower surface of the video display unit 12 with the detent arms 180 on the bracket 176.

A lower end 196 of the elongated member 172 of the bracket 146 includes the main features necessary for guiding the movement of the bracket 146 between the retracted and extended positions relative to the housing 142 and biasing the movement thereof towards the extended position while also forming a retainer via the push-push mechanism defined by the return and release grooves 156 and 158, the angular transfer groove 160 and the retainer portion 162 in the rearward wall 150 of the housing 142. Along these lines, the lower end 196 of the elongated member 172 includes a forwardly-extending flange 198 reinforced in the forward direction by a brace 200. A forward end of the flange 198 includes a roller 202 aligned generally with the vertical midline of the bracket 146. A pair of side flanges 204 extend laterally from the lower end 196 of the elongated member 172 and are adapted to be received in the second guide grooves 166 of the housing 142. A pin 206 is provided in a rearward direction extending from a rearward surface of the lower end 196 of the elongated member 172 and is in register with push-push grooves 156–162.

In assembly, the bracket 146 is mounted to the housing 142 by positioning the roller 202 on the bracket 146 within the first groove 154 on the forward wall 148 of the housing 142. The side flanges 204 of the bracket 146 are positioned within the second guide grooves 166 of the lateral brackets 164 of the housing 142. The pin 206 is positioned within the push-push mechanism defined by the grooves 156–162. The leaf springs 168 mounted to the housing 142 by the bearings 170 have an outer distal end attached to a forward portion of the flange 198 of the bracket 146 whereby the leaf springs 168 bias the bracket 146 in an upward direction with respect to the housing 142 while the engagement of the roller 202 and side flanges 204 with the guide grooves 154 and 166, respectively, the movement of the bracket 146 relative to the housing 142 is thereby maintained in a vertical direction.

The grooves 156–162 define the extension of the bracket 146 relative to the housing 142. The pin 106 of the bracket 146 is biased within the retainer portion 162 (by the leaf springs 168) at the lower end of the rearward wall 150 of the housing 142 when the bracket 146 is stored in the retracted position within the open interior 144 of the housing 142. When a user depresses the cover 30 or the bracket 176 of the bracket 146 relative to the housing 142, the pin 206 of the bracket 146 extends into the release groove 156 and travels therealong until it passes through the angular transfer groove 160 and into the upper end of the return groove 158 where it is biased there against by the leaf springs 168. When a user depresses the cover 30, video display unit 12 or bracket 176 relative to the housing 142, the pin 206 rides along the return groove 158 until it reaches the retainer portion 162 whereby the release of the downward pressure by the user returns the pin 206 to its lodgment within the retainer portion 162 and thereby returns the bracket 146 to the retracted position within the housing 142.

Figure 31:
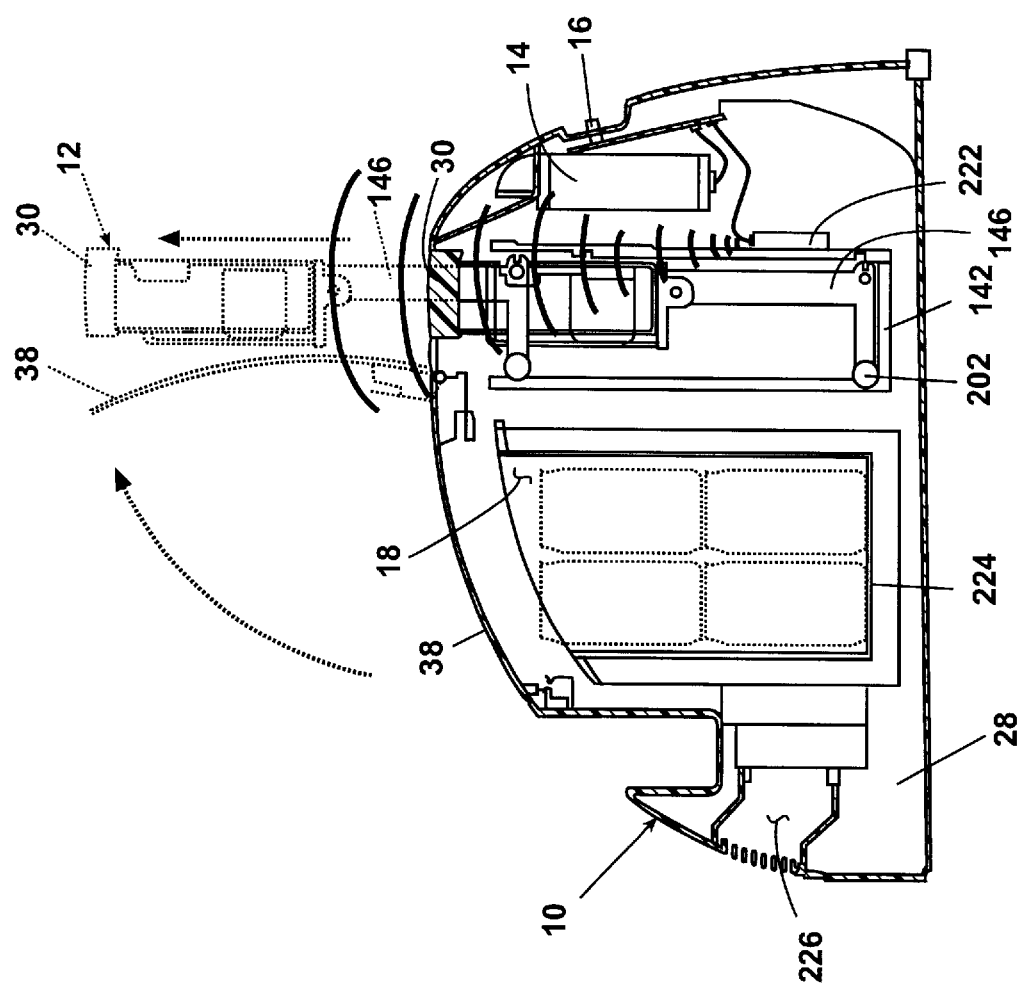
FIG. 31 is a cross-sectional view taken along a vertical center plane of an alternative embodiment of the console shown in FIGS. 27–28 having the housing with the adjustable display unit shown in FIGS. 28–30.
Figure 32:
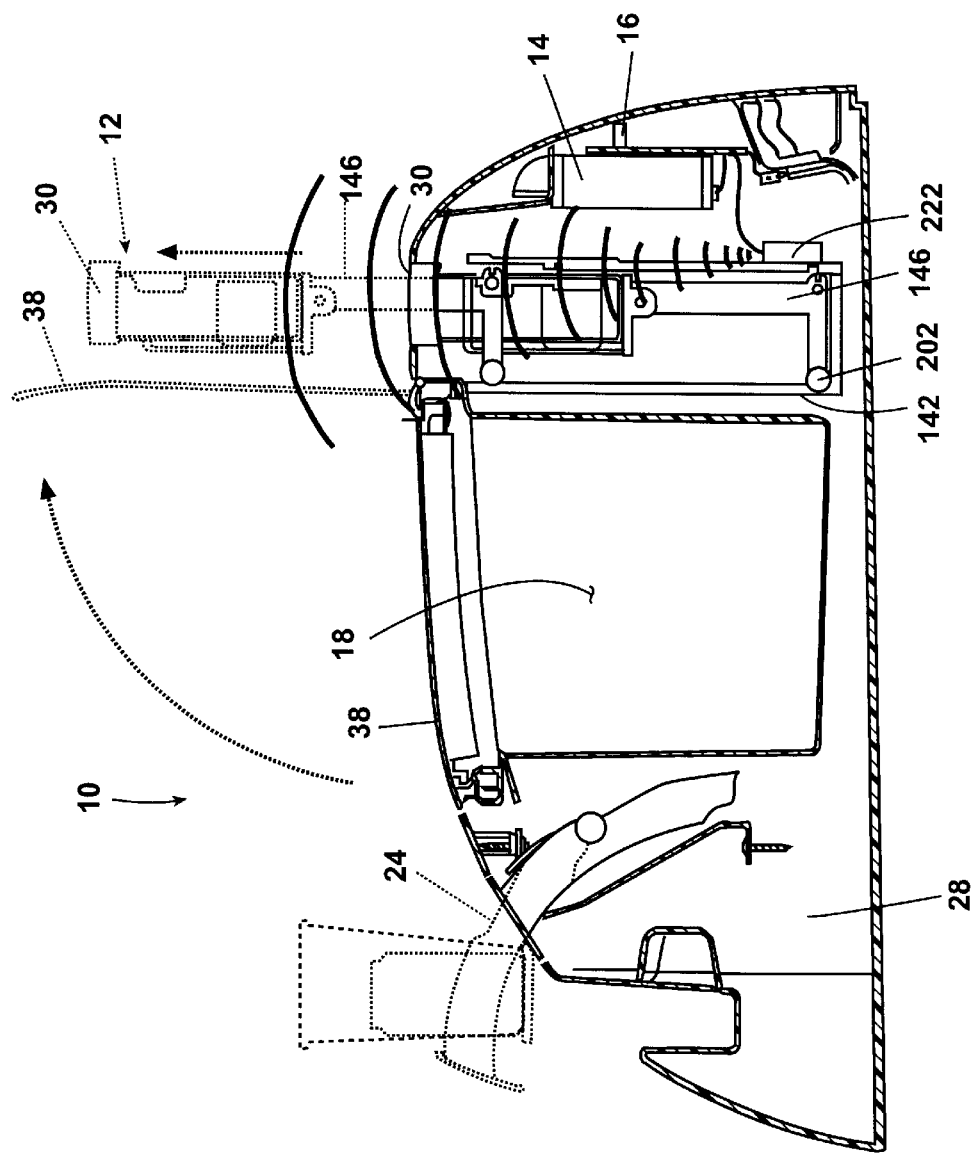
FIG. 32 is a cross-sectional view taken along a vertical center plane of another embodiment of the console shown in FIGS. 27–28 having the housing with the adjustable display unit shown in FIGS. 28–30.

FIGS. 31 and 32 show schematic cross-sectional views of alternative embodiments of the console 10 according to the invention having an adjustably-mounted video display unit 12 mounted therein such as with the bracket 146 and housing 142 assembly discussed with respect to FIGS. 28–30. As shown in these figures, the reporting/playback device 14 comprises a top-load DVD player mounted within the body 28 of the console 10 so that a loading slot of the recording/playback device can be accessed through the exterior surface of the console 10. As also can be seen, the control panel 16 for the recording/playback device 14 is mounted adjacent a rearward surface of the console 10 for access by occupants of the vehicle in which the console 10 is mounted. A transmitter 222 is operably interconnected to the recording/ playback device 14 via the control panel 16 and thereby sends signals from the recording/playback device 14 (or signals from any other video source interconnected to the control panel 16) to the video display unit 12 mounted atop the bracket 146 or released therefrom by depressing the display unit release button 182 on the bracket 146. The consoles 10 shown in FIGS. 31 and 32 also include other storage areas 18 concealed by a cover 38, a container holder 24 retractably mounted in an other area of the console 10, as well as an optional item like a beverage cooler 224 operably interconnected to a vehicle power source (not shown). Further, the console 10 can also include an air register vent 226 interconnected to the vehicular heating and air conditioning system in a known fashion.

Thus, it can be clearly seen that the various embodiments of consoles 10 according to the invention are full-scale entertainment units which have an adjustably-mounted video display unit 12 mounted therein which can be concealed beneath a cover 30 for the console 10 and other entertainment items, such as a recording/playback device 14 and an associated control panel 16 which can be operably connected to the video display unit 12 either by a cable 100 or by a wireless transmitter 222. The embodiments of the console 10 described herein also include a great deal of storage as evidenced by the storage area 18 as concealed by a cover 38 which can contain a beverage cooler 224 and such convenience items as a container holder 24. The console 10 is interconnected to the vehicular power system by a conventional electrical interconnection and can also be interconnected to the vehicular heating and air conditioning system as evidenced by the vent 226.

In all of the above-described embodiments, the mounting of the video display unit 12 within the console 10 accomplishes several important objectives. First, the higher manufacturing cost and complexities of mounting the video display unit 12 to an overhead console are eliminated by storing the video display unit within a seat-level console. The video display unit 12 is vertically adjustable with respect to the console 10 as well as adjustable within several degrees of freedom via various pivot joints so that users located in front and rear seats of all ages and sizes can position the video display unit for optimum viewing.

While the invention has been specifically described in connection with certain specific embodiments thereof, it is to be understood that this is by way of illustration and not of limitation, and the scope of the appended claims should be construed as broadly as the prior art will permit.

What is claimed is:

1. A console adapted to be mounted between a pair of front seats within a passenger compartment in a vehicle comprising:

a body mounted between a pair of front seats within the passenger compartment having an outer surface and defining at least one storage compartment with an opening in the outer surface, a first cover pivotally mounted to the body between a closed position and an open position, the cover being in register with the opening in the closed position and forming a flush outer appearance with the outer surface; and a video display unit movably mounted to the first cover between a retracted position wherein the video display unit, with the first cover in a closed position, is enclosed within the storage compartment and an extended position wherein the video display unit extends beyond the outer surface;

said video display unit being positioned ergonomically for viewing by occupants of the vehicle when the video display unit is located in the extended position.

2. The console of claim 1 wherein the video display unit is hinged to the first cover.

3. The console of claim 2 where the hinge connecting the video display unit to the first cover is a damped hinge.

4. The console of claim 1 wherein the video display unit in its extended position extends beyond a perimeter formed by the body of the console and the first cover in its open position.

5. The console of claim 1 wherein the video display unit is removable so that it can be taken with passengers when they leave the vehicle.

\* \* \* \* \*